US012298002B2

(12) United States Patent
Zhu et al.

(10) Patent No.: US 12,298,002 B2
(45) Date of Patent: May 13, 2025

(54) REFLECTIVE ILLUMINATION STRUCTURE AND DESK LAMP

(71) Applicants: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujiang Sansi Optoelectronic Technology Co. Ltd., Jinhua (CN); Zhejiang Puzhao Photoelectric Technology Co.,Ltd., Jinhua (CN)

(72) Inventors: Guoli Zhu, Shanghai (CN); Min Han, Shanghai (CN); Defeng Ni, Shanghai (CN); Congyi Lin, Shanghai (CN)

(73) Assignees: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujlang Sansi Optoelectronic Technology Co. Ltd., Jinhua (CN); Zhejiang Puzhao Photoelectric Technology Co., Ltd., Jinhua (CN)

( * ) Notice: Subject to any disclaimer, the term of this patent is extended or adjusted under 35 U.S.C. 154(b) by 0 days.

(21) Appl. No.: 18/823,750

(22) Filed: Sep. 4, 2024

(65) Prior Publication Data

US 2025/0075878 A1 Mar. 6, 2025

(30) Foreign Application Priority Data

Sep. 6, 2023 (CN) ........................ 202311151432.8
Sep. 6, 2023 (CN) ........................ 202322424371.X

(51) Int. Cl.
*F21V 7/00* (2006.01)
*F21S 6/00* (2006.01)
(Continued)

(52) U.S. Cl.
CPC ............ *F21V 7/0025* (2013.01); *F21S 6/003* (2013.01); *F21V 17/10* (2013.01); *F21V 21/26* (2013.01);
(Continued)

(58) Field of Classification Search
CPC ........ F21V 7/0025; F21V 29/70; F21V 29/89; F21V 17/10; F21V 23/008; F21S 6/003
See application file for complete search history.

(56) References Cited

U.S. PATENT DOCUMENTS 4,701,832 A * 10/1987 Lasker .................. F21V 7/0025 362/323
5,530,628 A * 6/1996 Ngai ......................... F21V 7/28 362/127
(Continued)

FOREIGN PATENT DOCUMENTS

KR 20170037136 A * 4/2017 .............. F21V 29/70
WO WO-2008146229 A2 * 12/2008 .............. F21V 11/02

*Primary Examiner* — Zheng Song
(74) *Attorney, Agent, or Firm* — IPRTOP LLC

(57) ABSTRACT

A reflective illumination structure is provided. It includes a heat dissipation base, a lighting unit disposed at a top of the heat dissipation base, and a reflective lampshade enclosing the lighting unit. An inner wall of the reflective lampshade is provided with a specular reflection arc surface disposed at a bottom end of the inner wall of the reflective lampshade and a diffuse reflection arc surface disposed at a top end of the inner wall of the reflective lampshade. A part of light emitted from the lighting unit is directly emitted to the diffuse reflection arc surface, and another part of the light is reflected by the specular reflection arc surface and then is emitted to the diffuse reflection arc surface. The light
(Continued)

reflected by the diffuse reflection arc surface is emitted through a bottom of the reflective lampshade and forms a uniform rectangular light spot.

10 Claims, 3 Drawing Sheets

(51) Int. Cl.

| | |
|---|---|
| ***F21V 17/10*** | (2006.01) |
| ***F21V 21/26*** | (2006.01) |
| ***F21V 23/00*** | (2015.01) |
| ***F21V 29/70*** | (2015.01) |
| ***F21V 29/89*** | (2015.01) |

(52) U.S. Cl.
CPC ............ *F21V 23/008* (2013.01); *F21V 29/70* (2015.01); *F21V 29/89* (2015.01)

(56) References Cited

U.S. PATENT DOCUMENTS

| | | | | |
|---|---|---|---|---|
| 2008/0285273 | A1* | 11/2008 | Liu | F21S 6/003 362/240 |
| 2015/0233542 | A1* | 8/2015 | Li | F21V 7/0083 362/346 |
| 2019/0250324 | A1* | 8/2019 | Lim | G02B 6/32 |
| 2022/0231207 | A1* | 7/2022 | Tarsa | F21V 5/08 |

* cited by examiner

REFLECTIVE ILLUMINATION STRUCTURE AND DESK LAMP

FIELD OF THE INVENTION

The present disclosure relates to the technical field of home lighting, and in particular, to a reflective illumination structure and a desk lamp.

BACKGROUND OF THE INVENTION

A desk lamp, typically placed on a table with a base, serves primarily for illumination, making reading, studying, and work easier. However, as technology advances, desk lamps have evolved in terms of their light sources, appearance, and design, gradually taking on various forms and functionalities.

With the advantages of LED beads, such as small size, energy efficiency, and minimal heat emission, more and more desk lamp products now use LEDs as their light source. However, the illumination method based on LED beads often results in an extremely concentrated light source, leading to a small illuminated area. Consequently, the brightness at the lamp's lighting surface becomes excessively high, causing discomfort and even momentary blindness due to visual glare. Additionally, LED lighting principles indicate that higher brightness levels in LED illumination correspond to an increased proportion of blue light in the illumination light. Blue light can be harmful to the eyes, particularly in relation to macular degeneration. It can penetrate the lens and reach the retina, causing optical damage and accelerating oxidation of cells in the macular region. This process generates a large number of free radicals, leading to cataracts and degeneration of the macular area.

Existing LED desk lamps predominantly fall into two categories: downward-emitting and side-emitting. Downward-emitting desk lamps suffer from blue light issues since the human eye directly faces the light source. Furthermore, the light is often harsh and lacks uniformity. On the other hand, side-emitting desk lamps have lower lighting efficiency, insufficient brightness, and poor uniformity. Therefore, there is a need for an innovative illumination structure to address these challenges.

SUMMARY OF THE INVENTION

The present disclosure provides a reflective illumination structure and a desk lamp, which solve the problems commonly found in current desk lamps, including excessive blue light, harsh illumination, and uneven light distribution, whether emitted directly downward or from the sides.

The reflective illumination structure includes a heat dissipation base, a light unit disposed at a top of the heat dissipation base, and a reflective lampshade. The reflective lampshade encloses the lighting unit. An inner wall of the reflective lampshade is provided with a specular reflection arc surface and a diffuse reflection arc surface. The specular reflection arc surface is disposed at a bottom end of the inner wall of the reflective lampshade, and the diffuse reflection arc surface is disposed at a top end of the inner wall of the reflective lampshade; a part of light emitted from the lighting unit is directly emitted to the diffuse reflection arc surface, and another part of the light is reflected by the specular reflection arc surface and then is emitted to the diffuse reflection arc surface; an outer contour of the diffuse reflection arc surface is butterfly-shaped to satisfy that light reflected downward from the diffuse reflection arc surface becomes more uniform, and a lower edge of the reflective lampshade is rectangular-shaped, such that all downward reflected light is limited by the lower edge of the reflective lampshade; the light reflected by the diffuse reflection arc surface is emitted through a bottom of the reflective lampshade and forms a uniform rectangular light spot.

As a more preferred embodiment, the reflective lampshade comprises a specular reflection cover and a diffuse reflection cover, the diffuse reflection cover is clamped at a top of the specular reflection cover, the specular reflection arc surface is disposed on an inner wall of the specular reflection cover, and the diffuse reflection arc surface is disposed on an inner wall of the diffuse reflection cover. The split design of the reflective lampshade offers several advantages. Firstly, its modular structure facilitates mass production and improves the production efficiency. Secondly, the split-and-reassemble design simplifies the installation of the specular reflection arc surface and the diffuse reflection arc surface. All that's needed is to pre-assemble the specular reflection and diffuse reflection arc surfaces with their corresponding specular reflection and diffuse reflection covers before final assembly.

As a more preferred embodiment, the reflective lampshade further comprises a transparent cover, the transparent cover is clamped on the specular reflection cover, and a further part of the light emitted from the lighting unit is directly emitted through the transparent cover. In this way, the reflective illumination structure of the present disclosure can also emit light from the back. The light emitted from the back serves as auxiliary illumination. By adjusting the dimensions of the translucent cover, the intensity of the light emitted from the back can be controlled. Additionally, the translucent cover helps reduce blue light.

As a more preferred embodiment, the heat dissipation base comprises a heat sink and a substrate, the substrate is pressed on the heat sink, and the lighting unit is disposed on the substrate.

As a more preferred embodiment, the heat sink is made of aluminum materials. Aluminum materials have excellent thermal conductivity. This enhanced thermal performance allows the lighting unit to operate at higher power levels, resulting in greater brightness from the lighting unit.

As a more preferred embodiment, the substrate is made of ceramic materials. Ceramic materials exhibit exceptional structural stability, high-temperature resistance, wear resistance, and insulation properties. When used as a substrate, they can further enhance the lifespan and performance of the reflective illumination structure.

In order to solve the above technical problems, the present disclosure further provides a desk lamp, including the above reflective illumination structure, a transparent housing, a fixed base and a link structure. The transparent housing has transparent upper and lower surfaces and an opaque side surface. The transparent upper and lower surfaces are subjected to a frosted or translucent treatment to optimize uniformity and reduce blue light; an inner cavity of the transparent housing accommodates the reflective illumination structure. Two ends of the link structure are connected to the fixed base and the transparent housing, respectively, the transparent housing is supported on an upper side of the fixed base, and the reflective illumination structure projects downward to form the uniform rectangular light spot.

As a more preferred embodiment, the desk lamp further comprises an electric control unit, and an inner cavity of the fixed base accommodates the electric control unit. The electric control unit is configured to manage both the desk lamp's switch functionality and its brightness.

As a more preferred embodiment, the link structure comprises a first link and a second link, a first end of the first link is hinged to a first end of the second link at a first hinge point, a second end of the first link is hinged to the fixed base at a second hinge point, and a second end of the second link is hinged to the transparent housing at a third hinge point; relative angles formed by the first link, the second link, the fixed base and the transparent housing on two sides of the corresponding hinge point are adjustable, thereby adjusting different positions of the desk lamp. This adaptability caters to various user habits and different usage scenarios, ultimately enhancing the desk lamp's usability.

As a more preferred embodiment, the desk lamp further comprises a locking member disposed at each of the first hinge point, the second hinge point, and the third hinge point, when the adjusting of the position of the desk lamp is completed, each locking member is utilized by a user to lock a corresponding hinge structure, so that the position of the desk lamp can be stably maintained.

As described above, the reflective illumination structure and desk lamp of the present disclosure offer several beneficial effects. When using the reflective illumination structure, a part of light emitted from the lighting unit is directly emitted to the diffuse reflection arc surface, and another part of the light is reflected by the specular reflection arc surface and then is emitted to the diffuse reflection arc surface. The light reflected by the diffuse reflection cover is emitted through the bottom of the reflective lampshade and forms the uniform rectangular light spot. Additionally, the originally concentrated illumination light, due to the process of diffuse reflection, significantly increases the illuminated area. Furthermore, the illumination light undergoes reduced blue light due to diffuse reflection, resulting in softer and healthier emitted light, with minimal light loss during this process, leading to improved overall efficiency. The extended light path achieved by the reflective illumination structure, which emits light through reflection, allows for a more compact lamp body compared to traditional downward or side-emitting desk lamps. With a lamp head size within 140 mm, the rectangular light spot projected is both soft and evenly distributed, making it suitable for scenarios such as reading and working. Moreover, it complies with the illumination and illumination uniformity requirements specified in item 6.4.2 in GB/T 9473-2022, "Performance requirements for table lamps for paper task". The desk lamp of the present disclosure utilizes a reflective illumination structure, resulting in emitted light with low blue light and a gentle, uniform quality. It is highly suitable for everyday reading, studying, and working scenarios. By leveraging the properties of diffuse reflection, the reflective illumination structure and desk lamp of the present disclosure provide healthier and more evenly distributed illumination light. It addresses the issues commonly found in existing desk lamps, such as excessive blue light, harsh illumination, and uneven light distribution, whether emitted directly downward or from the sides.

REFERENCE NUMERALS

Figure 1:
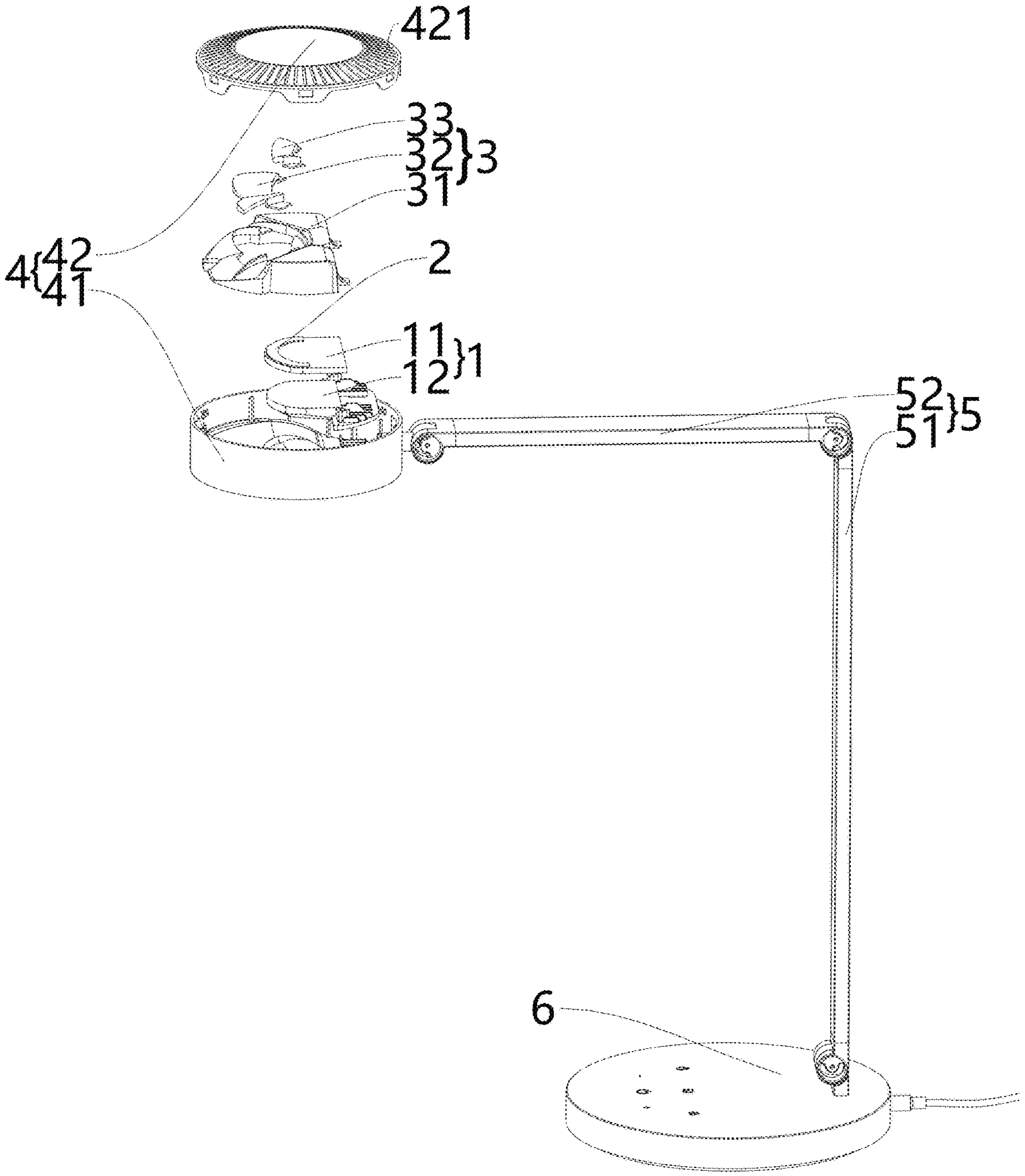
FIG. 1 shows a schematic diagram of a reflective illumination structure and a desk lamp according to the present disclosure.

1 Heat dissipation base
11 Substrate
12 Heat sink
2 Lighting unit
3 Reflective lampshade
31 Specular reflection cover
32 Diffuse reflection cover
33 Transparent cover
4 Transparent housing
41 Lower shell
42 Upper shell
421 Grid
5 Link structure
51 First link
52 Second link
6 Fixed Base

DETAILED DESCRIPTION OF THE INVENTION

The embodiments of the present disclosure will be described below. Those skilled can easily understand disclosure advantages and effects of the present disclosure according to contents disclosed by the specification.

It should be noted that the structure, ratio, size, etc. shown in the accompanying drawings in this specification are only used to illustrate the content disclosed in the specification for the understanding and reading of those familiar with this technology, and are not intended to limit the implementation of the present invention. Any structural modification, proportional relationship change or size adjustment should still fall within the scope of the present disclosure, given that no effect and objective achievable by the present disclosure are hindered. The following detailed description should not be considered as limited, and the scope of the embodiments of the present disclosure is limited only by the claims of the published patent. The terms used herein are only intended to describe specific embodiments and are not intended to limit the present disclosure. Spatially related terms, such as "upper", "lower", "left", "right", "downward", "below", "bottom", "above", "top", etc., can be used in the text for ease of explanation of the relationship between one element or feature and another element or feature shown in the figure.

In the present disclosure, unless otherwise expressly specified, terms such as "installation", "connection", "coupling", "fixing", and "holding" should be broadly understood. For example, when one element is referred to as being "connected to" another element, one element may be fixedly connected to or detachably connected to another element, may be mechanically connected to or electrically connected to another element, may be directly connected to another element, or may be indirectly connected to another element with another element interposed therebetween. These two elements may also communicate with each other internally. For those skilled in the art, the specific meanings of the above terms in the present disclosure can be understood based on specific situations.

As used herein, the singular forms "a", "an" and "said/the" are intended to include the plural forms, unless the context clearly points out differently. It should be further understood that the terms "include" and "comprise" indicate the existence of the described features, steps, operations, elements, components, items, categories, and/or groups, but do not exclude the existence, presence, or addition of one or more other features, steps, operations, elements, components, items, categories, and/or groups. As used herein, the terms "or" and "and/or" are inclusive, and are used to include any of the associated listed items and all combinations thereof. Thus, "A, B or C" or "A, B and/or C" means "any of the following: A; B; C; A and B; A and C; B and C; A, B and C". Exceptions to this definition apply only when combinations of elements, functions or operations are inherently paradoxical in some way.

As shown in FIGS. 1-4, the present disclosure provides a reflective illumination structure, including a heat dissipation base 1, a lighting unit 2 disposed at a top of the heat dissipation base 1, and a reflective lampshade 3.

The reflective lampshade 3 encloses the lighting unit 2. An inner wall of the reflective lampshade 3 is provided with a specular reflection arc surface and a diffuse reflection arc surface; the specular reflection arc surface is disposed at a bottom end of the inner wall of the reflective lampshade 3, and the diffuse reflection arc surface is disposed at a top end of the inner wall of the reflective lampshade 3; a part of light emitted from the lighting unit 2 is directly emitted to the diffuse reflection arc surface, and another part of the light is reflected by the specular reflection arc surface and then is emitted to the diffuse reflection arc surface; an outer contour of the diffuse reflection arc surface is butterfly-shaped to satisfy that light reflected downward from the diffuse reflection arc surface becomes more uniform, and a lower edge of the reflective lampshade 3 is rectangular-shaped, such that all downward reflected light is limited by the lower edge of the reflective lampshade 3; the light reflected by the diffuse reflection arc surface is emitted through a bottom of the reflective lampshade 3 and forms a uniform rectangular light spot.

When using the reflective illumination structure, a part of light emitted from the lighting unit 2 is directly emitted to the diffuse reflection arc surface, and another part of the light is reflected by the specular reflection arc surface and then is emitted to the diffuse reflection arc surface. The light reflected by the diffuse reflection arc surface is emitted through the bottom of the reflective lampshade 3 and forms the uniform rectangular light spot. Additionally, the originally concentrated illumination light, due to the process of diffuse reflection, significantly increases the illuminated area. Furthermore, the illumination light undergoes reduced blue light due to diffuse reflection, resulting in softer and healthier emitted light, with minimal light loss during this process, leading to improved overall efficiency. The extended light path achieved by the reflective illumination structure, which emits light through reflection, allows for a more compact lamp body compared to traditional downward or side-emitting desk lamps. The rectangular light spot projected is both soft and evenly distributed, making it suitable for scenarios such as reading and working. Moreover, it complies with the illumination and illumination uniformity requirements specified in item 6.4.2 in GB/T 9473-2022, "Performance requirements for table lamps for paper task".

Figure 2:
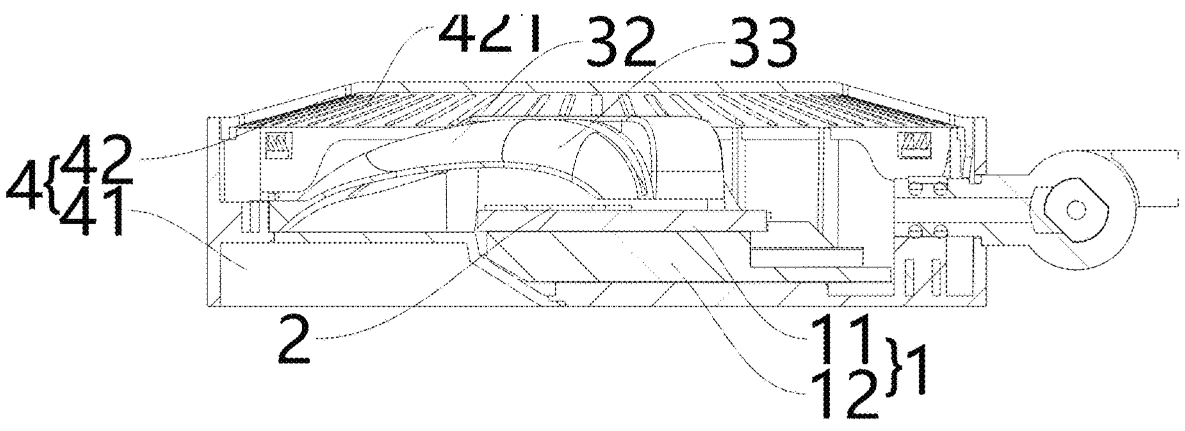
FIG. 2 shows a partial cross-sectional view of the reflective illumination structure according to the present disclosure.
Figure 3:
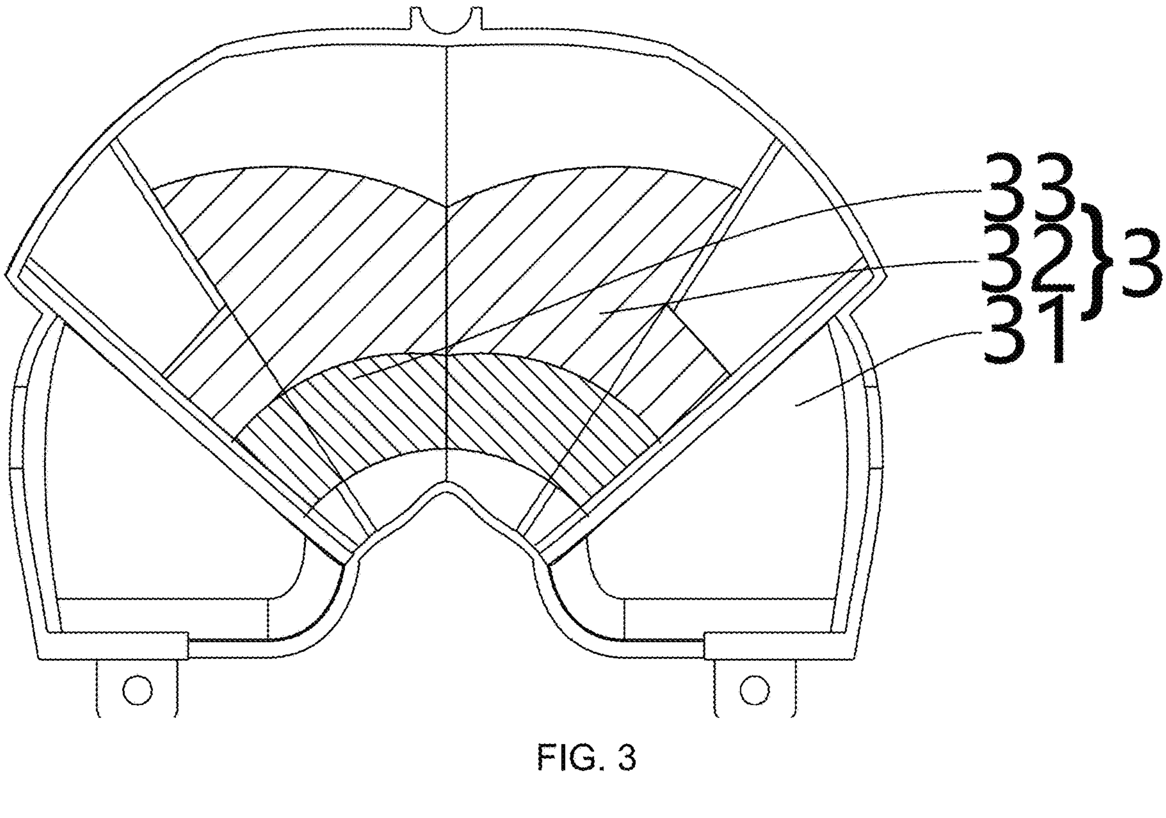
FIG. 3 shows a partial cross-sectional view of another perspective of the reflective illumination structure according to the present disclosure.

In one embodiment, as shown in FIGS. 1 and 2, the reflective lampshade 3 encloses the lighting unit 2 by fixing with the heat dissipation base 1. Further, threaded holes are respectively provided at corresponding positions of the reflective lampshade 3 and the heat dissipation base 1, and the reflective lampshade 3 is fixed to the heat dissipation base 1 by using screws through corresponding threaded holes.

In one embodiment, as shown in FIGS. 1 and 2, the reflective lampshade 3 includes a specular reflection cover 31 and a diffuse reflection cover 32, the diffuse reflection cover 32 is clamped at a top of the specular reflection cover 31, the specular reflection arc surface is disposed on an inner wall of the specular reflection cover 31, and the diffuse reflection arc surface is disposed on an inner wall of the diffuse reflection cover 32. In this way, the split design of the reflective lampshade 3 offers several advantages. Firstly, its modular structure facilitates mass production and improves the production efficiency. Secondly, the split-and-reassemble design simplifies the installation of the specular reflection arc surface and the diffuse reflection arc surface. All that's needed is to pre-assemble the specular reflection and diffuse reflection arc surfaces with their corresponding specular reflection cover 31 and diffuse reflection cover 32 before final assembly. Specifically, a specular reflection structure with the specular reflection arc surface is assembled with the specular reflection cover 31, and a diffuse reflection structure with the diffuse reflection arc surface is assembled with the diffuse reflection cover 32, then the assembled diffuse reflection assembly, including the diffuse reflection structure and the diffuse reflection cover 32, is clamped at the top of the assembled specular reflection assembly, including the specular reflection structure and the specular reflection cover 31.

In one embodiment, as shown in FIGS. 1 and 2, the reflective lampshade 3 further includes a transparent cover 33, the transparent cover 33 is clamped on the specular reflection cover 31, and a further part of the light emitted from the lighting unit 2 is directly emitted through the transparent cover 33. In this way, the reflective illumination structure of the present disclosure can also emit light from the back. The light emitted from the back of the reflective illumination structure can serve as auxiliary illumination. By adjusting the dimensions of the translucent cover 33, the intensity of the light emitted from the back can be controlled. Additionally, allowing part of the light to be emitted directly through the transparent cover 33 helps reduce blue light, which prevents direct exposure of the user's eyes to blue light when using a desk lamp.

Figure 4:
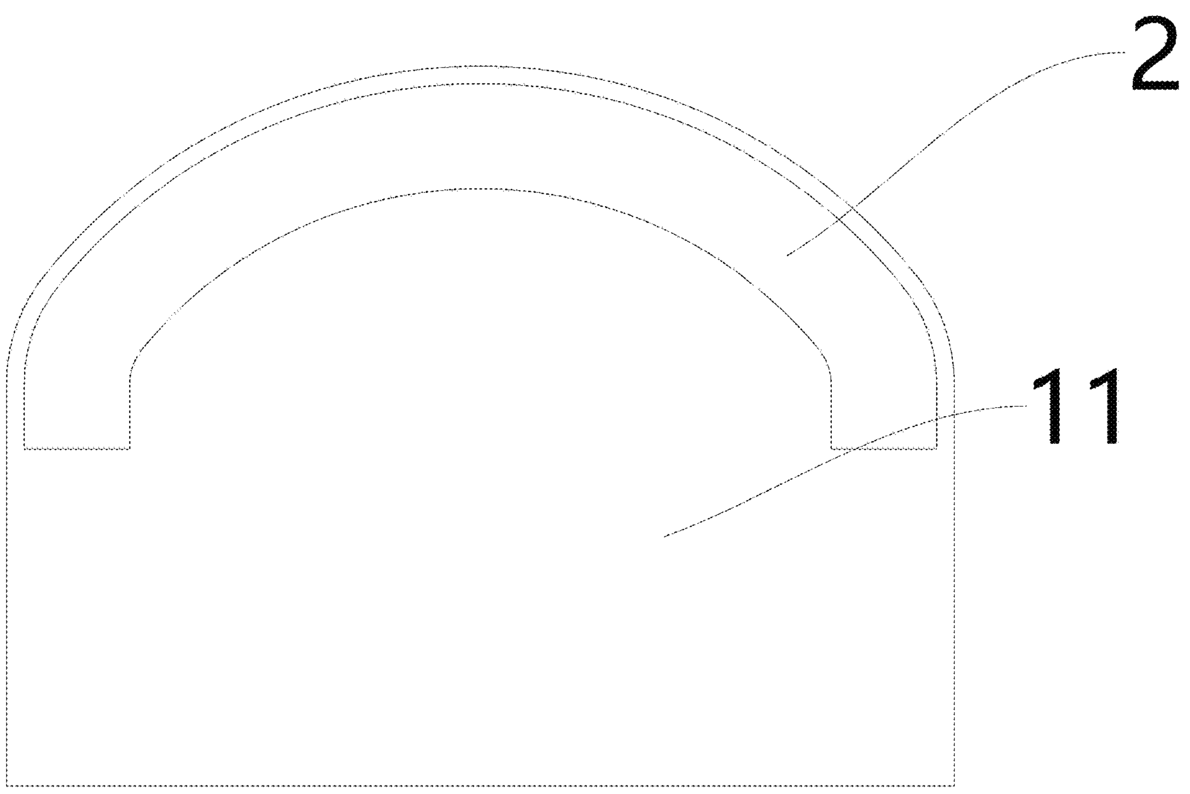
FIG. 4 shows a schematic diagram illustrating a connection between a lighting unit and a substrate of the reflective illumination structure according to the present disclosure.

In one embodiment, as shown in FIGS. 1, 2, and 4, the heat dissipation base 1 includes a heat sink 12 and a substrate 11, the substrate 11 is pressed on the heat sink 12, and the lighting unit 2 is disposed on the substrate 11.

In one embodiment, the heat sink 12 is made of aluminum materials. Aluminum materials have excellent thermal conductivity. This enhanced thermal performance allows the lighting unit 2 to operate at higher power levels, resulting in greater brightness from the lighting unit 2.

In one embodiment, as shown in FIG. 4, the substrate 11 is made of ceramic materials. Ceramic materials exhibit exceptional structural stability, high-temperature resistance, wear resistance, and insulation properties. When used as the substrate 11, the ceramic materials can further enhance the lifespan and performance of the reflective illumination structure. Additionally, the ceramic materials are fabricated using dry pressing techniques, involving compression and high-temperature firing, which increases its hardness and wear resistance. Furthermore, in one embodiment, alternative metal or non-metal materials can also be used to manufacture the substrate 11. Examples include aluminum-based substrates, copper-based substrates, and FR-4-grade material substrates. The substrate 11 can be arbitrarily placed, allowing for horizontal, tilted, or vertical orientations. In some embodiments, there are more than one such substrates 11, and the number of substrates 11 can be adjusted as needed.

Furthermore, in one embodiment, an outer contour of the transparent cover 33 is annular-shaped, realizing a better assembly with the diffuse reflection cover 32.

In one embodiment, the lighting unit 2 utilizes self-encapsulated light-emitting diodes (LEDs). These self-encapsulated LEDs provide robust protection for the internal light-emitting structure, preventing long-term exposure to air or mechanical damage that could lead to failure. This enhances overall stability. Additionally, the self-encapsulated LEDs offer excellent light extraction efficiency and effective heat dissipation, resulting in improved lighting efficiency and a better thermal environment for the lighting unit 2. Consequently, the lifespan of the LEDs is extended. Furthermore, the self-encapsulated LEDs used in the present disclosure may include various types, such as regular monochromatic LEDs, high-brightness LEDs, ultra-high-brightness LEDs, color-changing LEDs, flashing LEDs, voltage-controlled LEDs, infrared LEDs, and negative-resistance LEDs. Users can choose the most suitable type based on their specific needs and usage scenarios.

As shown in FIG. 1, in order to solve the above technical problems, the present disclosure further provides a desk lamp, including the above reflective illumination structure, a transparent housing 4, a fixed base 6, and a link structure 5.

The transparent housing 4 has transparent upper and lower surfaces and an opaque side surface. The transparent upper and lower surfaces are subjected to a frosted or translucent treatment to optimize uniformity and reduce blue light; an inner cavity of the transparent housing 4 accommodates the reflective illumination structure.

Two ends of the link structure 5 are connected to the fixed base 6 and the transparent housing 4, respectively, the transparent housing 4 is supported on an upper side of the fixed base 6, and the reflective illumination structure projects downward to form the uniform rectangular light spot.

The desk lamp of the present disclosure utilizes the reflective illumination structure, resulting in emitted light with low blue light and a gentle, uniform quality. It is highly suitable for everyday reading, studying, and working scenarios.

In one embodiment, as shown in FIGS. 1 and 2, the transparent housing 4 includes an upper shell 42 and a lower shell 41, the lower shell 41 is fixedly connected with the heat dissipation base 1 of the reflective illumination structure through threads, and the upper shell 42 is clamped with the lower shell 41 through buckles. The structural design of the upper and lower shells of the transparent housing 4 facilitates the installation of the reflective illumination structure. Additionally, a top of the upper shell 42 is provided with a grid 421, the grid 421 is transparent, and the light emitted from the lighting unit 2 can be emitted from the upper shell 42 through the transparent cover 33, further enhancing the transparent effect of the upper shell 42. Furthermore, a part of the light emitted from the lighting unit 2 is directly emitted from the transparent cover 33, which further reduces blue light and prevents direct exposure of the user's eyes to blue light when using a desk lamp.

In one embodiment, the desk lamp further includes an electric control unit, and an inner cavity of the fixed base 6 accommodates the electric control unit. The electric control unit controls both the desk lamp's switch functionality and its brightness. Additionally, the desk lamp further includes a power cable that extends from the electric control unit and connects to the power source. Simultaneously, the electric control unit is connected to a self-encapsulated LED of the reflective illumination structure, and provides electric control signals and power for the self-encapsulated LED.

In one embodiment, as shown in FIG. 1, the link structure 5 includes a first link 51 and a second link 52, a first end of the first link 51 is hinged to a first end of the second link 52 at a first hinge point, a second end of the first link 51 is hinged to the fixed base 6 at a second hinge point, and a second end of the second link 52 is hinged to the transparent housing 4 at a third hinge point. Relative angles formed by the first link 51, the second link 52, the fixed base 6 and the transparent housing 4 on two sides of the corresponding hinge point are adjustable. Specifically, a first angle formed by the first link 51 and the second link 52 on two sides of the first hinge point, a second angle formed by the first link 51 and the fixed base 6 on two sides of the second hinge point, and a third angle formed by the second link 52 and the transparent housing 4 on two sides of the third hinge point, are all adjustable, thereby adjusting different positions of the desk lamp. This adaptability caters to various user habits and different usage scenarios, ultimately enhancing the desk lamp's usability. Furthermore, in one embodiment, the desk lamp further includes multiple locking members, each one is disposed at one of the above hinge points; when the adjusting of the position of the desk lamp is completed, each locking member is utilized by a user to lock a corresponding hinge structure, so that the position of the desk lamp can be stably maintained. For example, a first locking member disposed at the first hinge point may be used to lock a first hinge structure including the first link 51 and the second link 52, a second locking member disposed at the second hinge point may be used to lock a second hinge structure including the first link 51 and the fixed base 6, a third locking member disposed at the third hinge point may be used to lock a third hinge structure including second link 52 and the transparent housing 4.

In summary, by leveraging the properties of diffuse reflection, the reflective illumination structure and desk lamp of the present disclosure provide healthier and more evenly distributed illumination light. It addresses the issues commonly found in existing desk lamps, such as excessive blue light, harsh illumination, and uneven light distribution, whether emitted directly downward or from the sides. Therefore, the present disclosure effectively overcomes various shortcomings in the existing technology and has high industrial utilization value.

The above-mentioned embodiments are for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

The invention claimed is:

1. A reflective illumination structure, comprising:

a heat dissipation base (1);

a lighting unit (2), disposed at a top of the heat dissipation base (1);

a reflective lampshade (3), configured to enclose the lighting unit (2), wherein an inner wall of the reflective lampshade (3) is provided with a specular reflection arc surface and a diffuse reflection arc surface;

wherein the specular reflection arc surface is disposed at a bottom end of the inner wall of the reflective lampshade (3), and the diffuse reflection arc surface is disposed at a top end of the inner wall of the reflective lampshade (3); a part of light emitted from the lighting unit (2) is directly emitted to the diffuse reflection arc surface, and another part of the light is reflected by the specular reflection arc surface and then is emitted to the diffuse reflection arc surface; an outer contour of the diffuse reflection arc surface is butterfly-shaped to satisfy that light reflected downward from the diffuse reflection arc surface becomes more uniform, and a lower edge of the reflective lampshade (3) is rectangular-shaped, such that all downward reflected light is limited by the lower edge of the reflective lampshade (3); the light reflected by the diffuse reflection arc surface is emitted through a bottom of the reflective lampshade (3) and forms a uniform rectangular light spot.

2. The reflective illumination structure according to claim 1, wherein the reflective lampshade (3) comprises a specular reflection cover (31) and a diffuse reflection cover (32), wherein the diffuse reflection cover (32) is clamped at a top of the specular reflection cover (31), wherein the specular reflection arc surface is disposed on an inner wall of the specular reflection cover (31), and the diffuse reflection arc surface is disposed on an inner wall of the diffuse reflection cover (32).

3. The reflective illumination structure according to claim 2, wherein the reflective lampshade (3) further comprises a transparent cover (33), wherein the transparent cover (33) is clamped on the specular reflection cover (31), and a further part of the light emitted from the lighting unit (2) is directly emitted through the transparent cover (33).

4. The reflective illumination structure according to claim 1, wherein the heat dissipation base (1) comprises a heat sink (12) and a substrate (11), wherein the substrate (11) is pressed on the heat sink (12), and the lighting unit (2) is disposed on the substrate (11).

5. The reflective illumination structure according to claim 4, wherein the heat sink (12) is made of aluminum materials.

6. The reflective illumination structure according to claim 4, wherein the substrate (11) is made of ceramic materials.

7. A desk lamp, comprising:

the reflective illumination structure according to claim 1;

a transparent housing (4), having transparent upper and lower surfaces and an opaque side surface, wherein the transparent upper and lower surfaces are subjected to a frosted or translucent treatment to optimize uniformity and reduce blue light; wherein an inner cavity of the transparent housing (4) is configured to accommodate the reflective illumination structure; and a fixed base (6) and a link structure (5), wherein two ends of the link structure (5) are connected to the fixed base (6) and the transparent housing (4), respectively, wherein the transparent housing (4) is supported on an upper side of the fixed base (6), and the reflective illumination structure projects downward to form the uniform rectangular light spot.

8. The desk lamp according to claim 7, further comprising an electric control unit, wherein an inner cavity of the fixed base (6) is configured to accommodate the electric control unit.

9. The desk lamp according to claim 7, wherein the link structure (5) comprises a first link (51) and a second link (52), a first end of the first link (51) is hinged to a first end of the second link (52) at a first hinge point, a second end of the first link (51) is hinged to the fixed base (6) at a second hinge point, and a second end of the second link (52) is hinged to the transparent housing (4) at a third hinge point; wherein a first angle formed by the first link (51) and the second link (52) on two sides of the first hinge point, a second angle formed by the first link (51) and the fixed base (6) on two sides of the second hinge point, and a third angle formed by the second link (52) and the transparent housing (4) on two sides of the third hinge point, are all adjustable, thereby adjusting different positions of the desk lamp.

10. The desk lamp according to claim 9, further comprising a locking member disposed at each of the first hinge point, the second hinge point, and the third hinge point, wherein when the adjusting of the position of the desk lamp is completed, each locking member is utilized by a user to lock a corresponding hinge structure, so that the position of the desk lamp can be stably maintained.

* * * * *